UNITED STATES PATENT OFFICE.

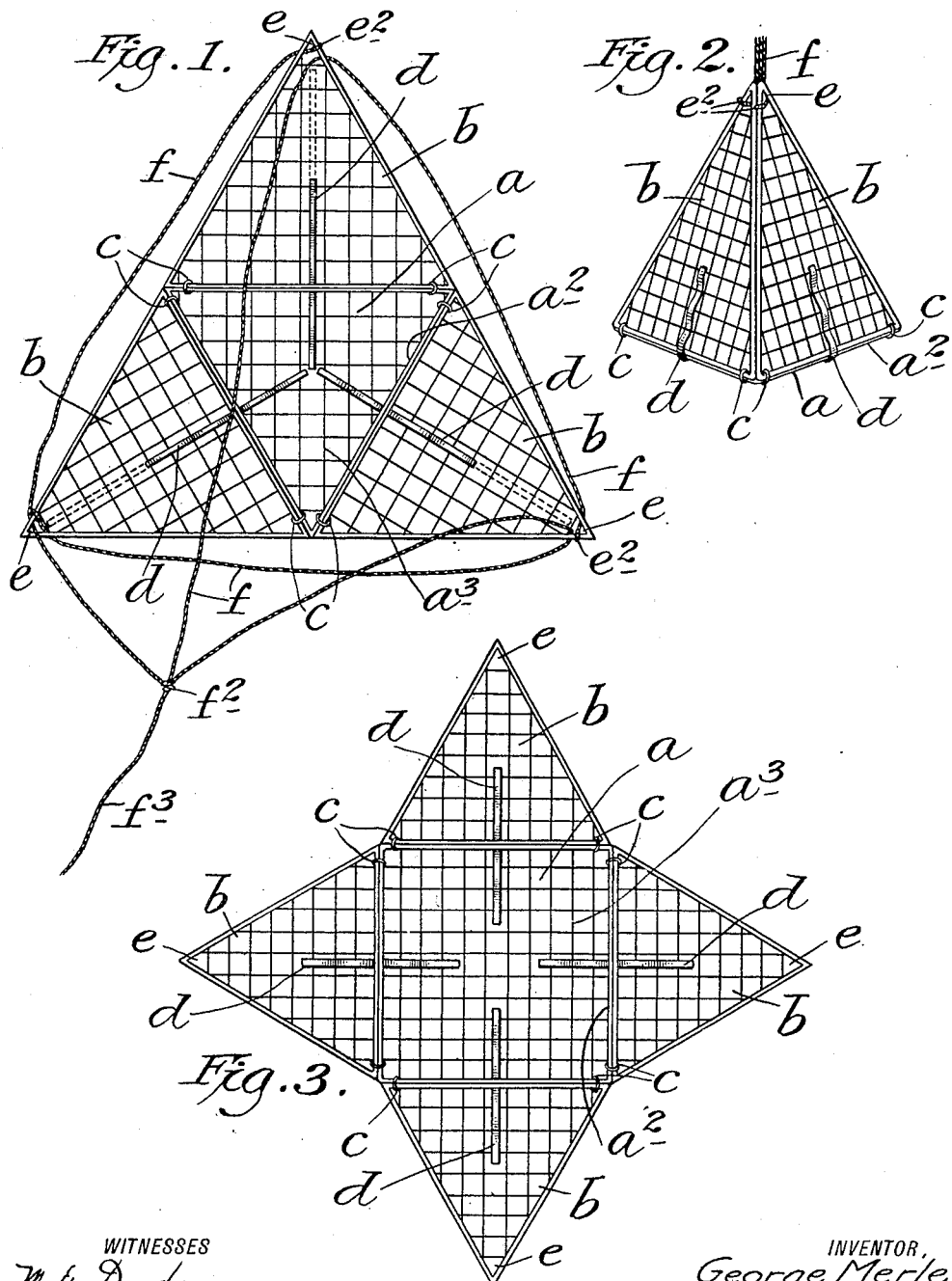

GEORGE MERLE, OF BROOKLYN, NEW YORK.

CRAB-TRAP.

No. 909,922.  Specification of Letters Patent.  Patented Jan. 19, 1909.

Application filed May 18, 1908. Serial No. 433,438.

*To all whom it may concern:*

Be it known that I, GEORGE MERLE, a citizen of the United States, and residing at Brooklyn, in the county of Kings and State of New York, have invented certain new and useful Improvements in Crab-Traps, of which the following is a specification, such as will enable those skilled in the art to which it appertains to make and use the same.

This invention relates particularly to crab traps and the object thereof is to provide an improved device of this class which is simple in construction and operation and which may be conveniently manipulated for catching crabs and other fish; a further object being to provide a trap of the class specified comprising a central openwork member and openwork side or side and end members connected therewith and adapted to be folded adjacent thereto, and said side members or side and end members being also adapted to lie flat or in the same plane with the central member, or to be folded upwardly to form a trap of pyramidal shape.

The invention is fully disclosed in the following specification, of which the accompanying drawing forms a part, in which the separate parts of my improvement are designated by suitable reference characters in each of the views, and in which:

Figure 1 is a plan view of my improved trap in position for use in which position the side or side and end members are expanded and lie flat in the same plane with the central member; Fig. 2 a view showing the side or side end members folded upwardly to form a complete trap; and, Fig. 3 a view similar to Fig. 1 but showing a modification.

In the practice of my invention, as shown in Figs. 1 and 2, I provide a main central triangular member $a$ composed of a wire frame $a^2$ which is filled in with open wire work $a^3$. I also provide three similar triangular side frames $b$ which are loosely connected with the main central triangular frame $a$ by rings $c$ in such manner as to permit the frames $b$ to fold closely adjacent to the frame $a$ so as to enable the device to be packed in a small space, and in connection with each of the frames $b$, I employ a thin spring strip $d$, and these spring strips, when the trap is in use, are threaded through the open wire mesh of the separate frames $b$ into and through the wire mesh of the central frame $a$ as clearly shown in Fig. 1. The spring strips $d$ are very thin and flexible and the separate parts of the trap, or the side and end members $b$, will readily fold into the position shown in Fig. 2. The wire mesh which forms the body part of each of the frames $b$ also forms at the corners of said frames apertures $e$, and connected with the outer corner of each of the frames $b$, as shown at $e^2$, is a cord $f$, and these cords, in the construction shown, are each carried around to the left and passed through the aperture $e$ of the adjacent frame $b$, and said cords are then connected as shown at $f^2$ and the ordinary trap line $f^3$ is connected therewith.

In the operation of this trap, the bait is placed on the central frame $a$ and the trap is sunk into the water from a boat, wharf, pier, raft or any similar device, and when the trap strikes the bottom, the line $f$ is loosened and the frame members $b$ at once expand and lie flat on the bottom in the same plane as the central frame $a$. In this position of the parts of the trap sea-grass, weeds or other substances or material carried by the currents will pass over the trap and will not become engaged therewith or entangled therein, and a pull on the line $f^3$, to raise the trap, will at once throw the frame members $b$ into the position shown in Fig. 2 and form a complete closed trap in which the crabs or other fish are retained. The general form of the trap shown in Fig. 2 is that of a pyramid with three sides and this form permits the trap to be raised through the water easily and also prevents sea-grass or similar material from collecting thereon during said operation.

The construction shown in Fig. 3 is the same as that shown in Fig. 1, except that the central frame member $a$ is rectangular in form, and this necessitates the use of four of the triangular frame members $b$, and with this form of construction four of the cords $f$ will be employed and said cords will be attached and operated in the manner shown in Fig. 1. By connecting the cords $f$ with the outer points of each of the frames $b$ and carrying said cords around and connecting them loosely with the outer corners of the adjacent frames as shown in Fig. 1, I provide means for drawing the outer points of the frame members $b$ together, as shown in Fig. 2, and holding them together so as to prevent lateral movement even when the hinged connections at *c* are very loosely made, but my invention is not limited to the use of rings *c* for making the connections between the frame members *a* and *b*, and this connection may be made in any desired manner. In folding the frames *a* and *b* compactly together the springs *d* are moved inwardly entirely within the central frame *a* or outwardly entirely within the frame members *b*, the last named position of said springs being indicated in dotted lines in Fig. 1.

Having fully described my invention, what I claim as new and desire to secure by Letters Patent, is:—

1. A crab trap composed of a central openwork frame and triangular side frames loosely connected with the sides thereof and adapted to be folded flat thereon and on each other, detached spring devices adapted to be threaded through the open-work of said frames when the triangular frames are in an extended position or in the same plane as the central frame and permit of said triangular frames being folded, and flexible devices connected with the outer corners of the triangular frames and by which the trap is lowered into the water and raised therefrom, said devices being also adapted to draw the outer corners of the triangular frames together and hold them together.

2. A crab trap composed of a central open work frame and triangular open work frame members loosely connected with the sides thereof and adapted to be folded flat thereon and on each other, spring devices which operate to hold the triangular frame members in an extended position or in the same plane as the central frame member while permitting said triangular frame members to be folded upwardly, and devices adapted to be connected with the outer corners of the triangular frame member, and by which the trap is lowered into the water and raised therefrom, said devices being also adapted to draw the outer corners of the triangular frame members together and hold them together, consisting of cords connected with the outer corner of each of the triangular frame members and passed loosely through the outermost corner of the next adjacent outer frame member.

3. A crab trap composed of a central open work frame member, and outer open work frame members loosely connected with the sides thereof and adapted to be folded thereon, and loose and detachable spring devices adapted to be threaded through the open work frames at their adjacent sides and to hold the outer frame members in an extended position or in the same plane as the central frame member while permitting said outer frame members to be folded upwardly.

4. A crab trap composed of a central open work frame member and outer open work frame members loosely connected with the sides thereof and adapted to be folded thereon, and loose and detachable spring devices adapted to be threaded through the open work frames at their adjacent sides and to hold the outer frame members in an extended position or in the same plane as the central frame member while permitting said outer frame members to be folded upwardly, said outer frame members being each provided at its outermost point with a cord which is secured thereto and passed loosely through the outermost part of the next adjacent outer frame member.

In testimony that I claim the foregoing as my invention I have signed my name in presence of the subscribing witnesses this 16th day of May, 1908.

GEORGE MERLE.

Witnesses:
 M. E. DOODY,
 C. E. MULREANY.